E. W. PACKER.
Transplanting Implement.
No. 53,662.
Patented Apr. 3, 1866.
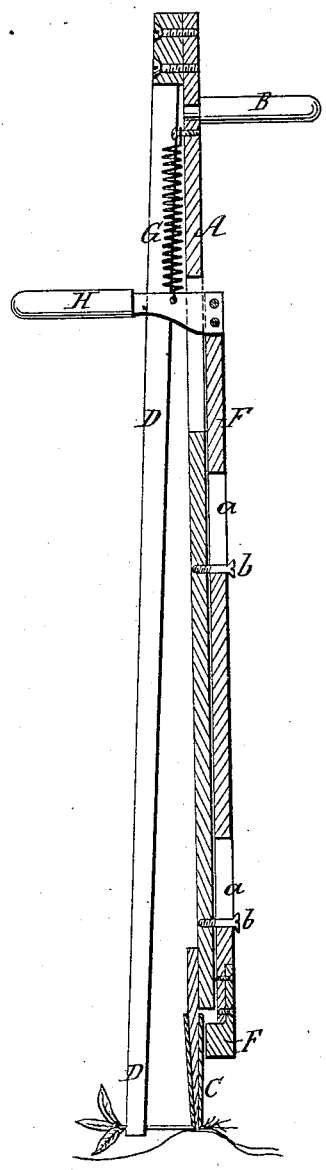
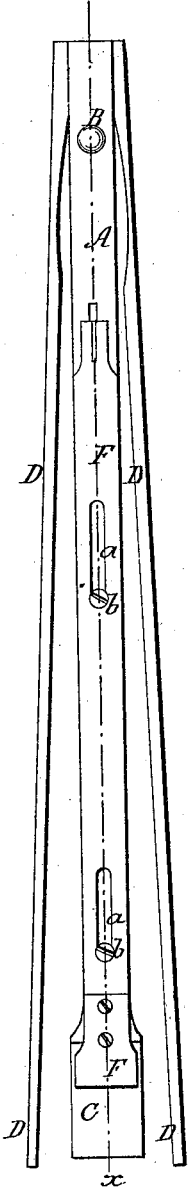

UNITED STATES PATENT OFFICE.

EDMUND W. PACKER, OF PAULSBOROUGH, NEW JERSEY.

IMPROVEMENT IN IMPLEMENTS FOR SETTING OUT PLANTS.

Specification forming part of Letters Patent No. 53,662, dated April 3, 1866.

*To all whom it may concern:*

Be it known that I, EDMUND W. PACKER, of Paulsborough, in the county of Gloucester and State of New Jersey, have invented a new and Improved Implement for the Setting Out of Sweet-Potato, Cabbage, and other Plants; and I do hereby declare that the following is a full, clear, and exact description thereof, which will enable those skilled in the art to make and use the same, reference being had to the accompanying drawings, forming part of this specification.

The object of this invention is to provide a tool or implement with which sweet-potato, cabbage, and other plants can be expeditiously set out or planted in the ground, and with but very little manual labor, the implement embraced by the present improvements not requiring the person using it to stoop, which by the mode hitherto practiced for the setting out of such plants with the hands occasioned much pain in the person's back, and therefore was quite tedious and tiresome.

In the accompanying plate of drawings my improved implement is illustrated, Figure 1 being a side elevation of the same, and Fig. 2 a vertical section taken in the plane of the line $x\ x$, Fig. 1, showing my implement in operation.

The implement embraced by the present invention consists of a staff (marked A in the drawings) of the proper length to allow it to be used by a person when standing or in an upright posture or position, which staff, at or near its upper end, has a handle, B, for convenience in holding it in the hand. On the lower end of staff A is secured a wedge-shaped piece, C, the edge of which is made a little rounding. On each edge of the staff A is secured a tong-lever, D, corresponding in length to that of the staff, by and between which tongs, at their lower ends, the stalk of the plant is held by simply bringing them together, grasping them with the left hand, and taken to and laid upon the hill in which it is to be placed with the wedge-shaped end of the staff A resting upon it, as plainly shown in Fig. 2. The hand is then removed from the tongs, thus releasing their hold upon the plant, when, bearing down upon the handle B of the staff, the plant is necessarily forced into the ground, and to any desired depth, by simply exerting more or less force upon the staff, when the staff-plate is withdrawn, and at the same time the ram or plunger-rod F, attached to one side of the staff A, moving by vertical slots $a$ on and guided by the pins or studs $b$ of the same, is forced down, pressing the earth around and about the plant, when, releasing the pressure upon such ram, it is drawn back by the action of the spiral spring G, secured at one end to it and at its other to the staff A. H, a handle secured to ram, F, for convenience in operating it.

By the use of the planting implement hereinabove described it is obvious that the labor in the setting out of the plants is greatly diminished and enabled to be accomplished with great expeditiousness, at the same time not being tedious or tiresome in the least.

I claim as new and desire to secure by Letters Patent—

The combination of the staff A, tongs D D, and ram F, when arranged together so as to operate substantially in the manner described, for the purpose specified.

EDMUND W. PACKER.

Witnesses:
 THOMAS C. HANNOLD,
 JAMES L. GIBBS.